United States Patent [19]

Bochan

[11] 4,112,767
[45] Sep. 12, 1978

[54] CLOTHES DRYER VARIABLE SPEED DRIVE SYSTEM

[75] Inventor: John Bochan, Louisville, Ky.

[73] Assignee: General Electric Company, Louisville, Ky.

[21] Appl. No.: 784,605

[22] Filed: Apr. 4, 1977

[51] Int. Cl.² .................. F16H 7/12; F16H 11/08
[52] U.S. Cl. ................................. 74/217 R; 74/227; 74/242.15 R
[58] Field of Search ............ 34/58; 74/217 R, 217 S, 74/226, 227, 242.11 R, 242.11 C, 242.11 E, 242.11 W, 242.15 R

[56] References Cited

U.S. PATENT DOCUMENTS

| | | | |
|---|---|---|---|
| 952,156 | 3/1910 | Trewhella | 74/242.11 A |
| 1,776,419 | 9/1930 | Dodge | 74/242.11 R X |
| 2,995,944 | 8/1961 | Ciaccio | 74/217 R |
| 3,006,218 | 10/1961 | Maxey | 74/217 R X |
| 3,864,986 | 2/1975 | Bochan | 74/242.11 C X |
| 4,019,397 | 4/1977 | Bochan | 74/242.15 R X |

Primary Examiner—Carlton R. Croyle
Assistant Examiner—Michael Koczo, Jr.
Attorney, Agent, or Firm—Frederick P. Weidner; Bruce A. Yungman; Francis H. Boos

[57] ABSTRACT

A variable speed drive system for a clothes dryer having a driven rotatable drum wherein the drum may be rotated at high speed, low speed, or no speed during operation of the machine. There is provided an improved mechanism for transmitting torque between a driving rotatable member and the driven rotatable drum through an endless drive belt. The driving rotatable member has a first diameter area and a second diameter area, the first area having a greater diameter than the second. There are two pulley assemblies each being pivotable about each of the first and second diameter areas and each having a drive belt. A shift mechanism for controlling the three modes of drum operation is provided which includes capability to rotate selectively each of the pulley assemblies about the driving member which causes one or both of the drive belts to slip to accomplish the desired mode of drum operation.

6 Claims, 6 Drawing Figures

CLOTHES DRYER VARIABLE SPEED DRIVE SYSTEM

BACKGROUND OF THE INVENTION

1. Field of the Invention

The present invention relates to clothes drying machines and more particularly to arrangements for varying the speed of rotation of the clothes dryer drum containing the articles to be dried during the drying operation.

2. Description of the Prior Art

It is generally known that in drying clothes, optimum results can be obtained if the speed of rotation of the drying drum can be varied depending on the weight and type of clothes load being dried. In the usual situation, where only a single rotative speed is used for all clothes loads, the single speed chosen for use must of necessity be a compromise speed. The speed chosen nominally will be about midway between the optimum speed for smaller loads than that for larger loads. Light loads are dried most efficiently if the drum is rotated at a speed less than the speed utilized for heavier loads. By varying the speed of the drum rotation depending upon the clothes load to be dried there is considerable effect on drying time and efficiency of the clothes dryer.

Various ways of changing the speed of rotation of the clothes dryer drum have been utilized in the past. For instance an automatic speed adjustment for clothes dryers is disclosed in U.S. Pat. No. 3,072,386 assigned to the same assignee as the present invention. In some cases a belt shifting device is used that changes the position of the belt with respect to a varying diameter of a driving shaft such as shown in U.S. Pat. No. 3,731,550. These prior art variable speed drive mechanisms were, however, complicated and often produced excessive belt wear with attendant belt failure.

In addition to having means of changing the speed of rotation of the clothes dryer drum it is often desirable to have a means to operate the dryer without rotation of the drum. This mode of operation may be desirable for mounting an internal stationary rack for hang drying certain garments and for drying items, such as tennis shoes, etc.

It is also important in production application, to have a tolerance for belt lengths; and means, preferably automatic, must be provided for taking up the slack that may result in a belt drive system due to this tolerance. Also, with use and age, the belt tends to lengthen and it is desirable that means should be provided for automatically taking up the slack that results. Prior art has taught the use of idler roller tensioners which are usually spring loaded to effect this operation. One such application is shown in U.S. Pat. No. 3,211,015—Bochan, assigned to the same assignee as the present invention. Others are shown in U.S. Pat. Nos. 3,330,049 and 3,402,617.

There is, however, no suitable mechanism for combining the functions of taking up the belt slack where idler roller tensioners may be eliminated and varying the rotational speed of the drum.

By the present invention, these deficiencies may now be overcome in that a clothes dryer having a drum rotatable at either a high speed, a low speed, or no speed and that the means also automatically adjusts for taking up any slack that results from tolerance or tendency of the belt to lengthen.

SUMMARY OF THE INVENTION

In accordance with the present invention, there is provided a clothes dryer machine having a driven rotatable drum wherein the drum may be rotated at high speed, low speed or not rotated at all during operation of the machine.

There is provided an improved mechanism for transmitting torque between a driving rotatable member and the driven rotatable drum through an endless drive belt. The improvement comprising the driving rotatable member being connected to a motor shaft and having a first diameter area and a second diameter area, the first area having a greater diameter than the second area. There is also provided two pulley assemblies, one being pivotable about the driving member first diameter area and one pivotable about the second diameter area and each assembly including two pulleys with outside diameter flanges, reduced interior diameters, and having their longitudinal axes of rotation parallel and spaced a fixed distance apart by a spacing member secured to each pulley at their respective axes of rotation. The longitudinal axis of rotation of the driving member is parallel to the rotational axes of the pulleys and arranged in a wedge-like relationship therebetween with the flanges of each pulley being in contact with the driving member. There is also provided a drive belt for each pulley assembly passing over the driving member at each of the respective first and second areas and then over the reduced interior diameters of both of the flanges pulleys. A shift mechanism for controlling the three modes of drum operation includes means to transmit torque from the driving member first area through its pulley assembly and belt to the drum causing the belt around the driving member second area to slip. Also included in the shift mechanism are means to rotate the pulley assembly about the driving member first area opposite the direction of rotation of the driving member thereby causing the belt to slip while torque is transmitted to the drum from the driving member second area through its pulley assembly and belt. To provide no torque being tansmitted to the drum while the clothes dryer machine is in operation there are means to rotate both pulley assemblies simultaneously about the driving member opposite the direction of rotation of the driving member thereby causing both belts to slip.

DESCRIPTION OF THE PREFERRED EMBODIMENT

Figure 1:
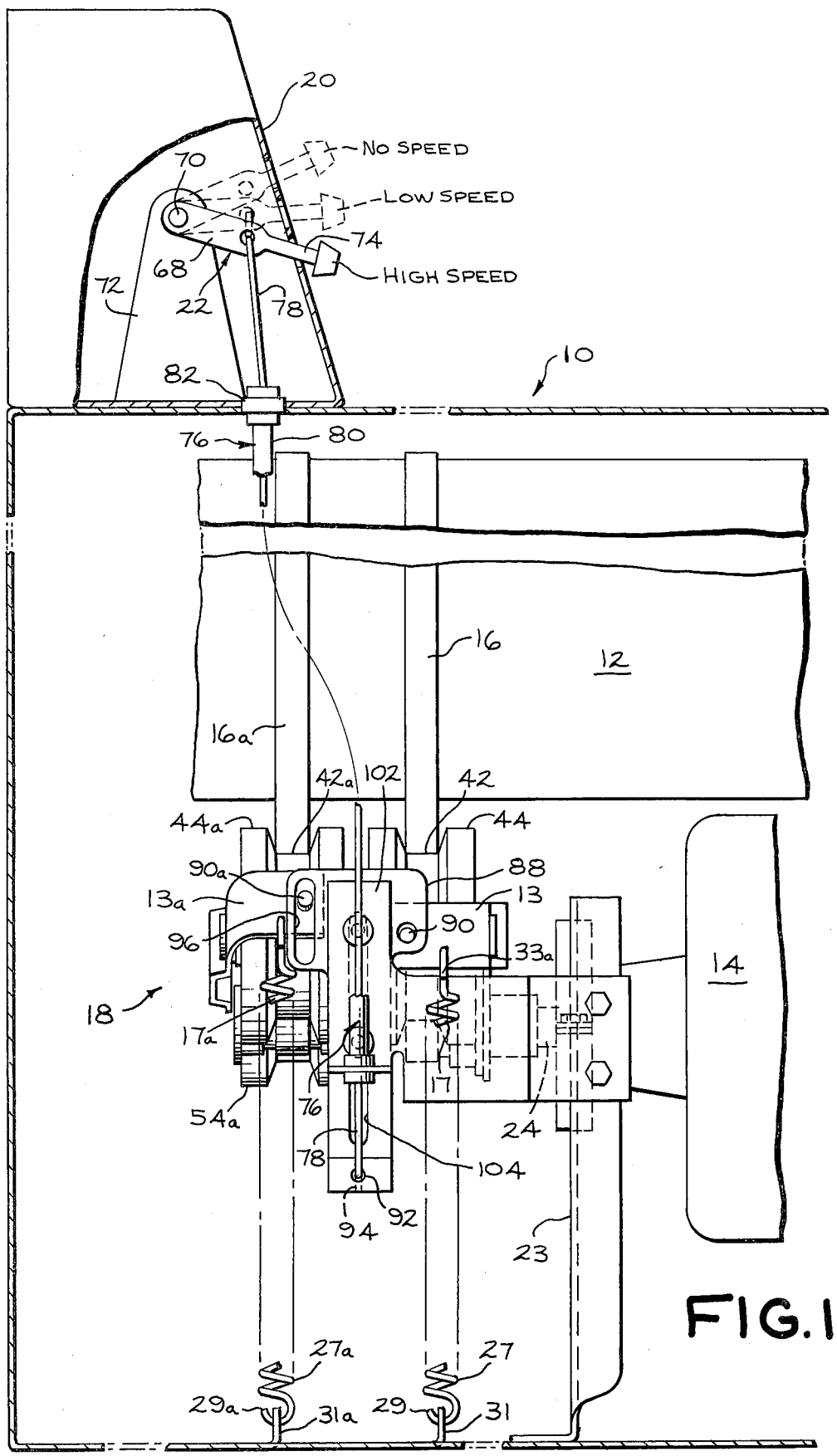
FIG. 1 is a view of a clothes dryer machine, partially broken away, showing one embodiment of the variable speed drive mechanism of the present invention shown in side elevation.

Referring to FIG. 1, there is shown a domestic clothes dryer machine 10 within which is housed a cylindrical horizontal axis rotatable drum 12 for receiving clothes to be dried. The drum is cradled at the front on a pair of slides or rollers (not shown) beneath the drum periphery. At the rear, the drum carries an axial stub shaft (not shown) extending rearwardly. By this arrangement the drum may be rotated about its horizontal axis. Such constructions and drum arrangements are well known in the field of clothes dryer technology. The drum is driven by an electric motor 14 and there is a mechanism for transmitting torque from the shaft of the electric motor to the drum through an endless drive belt 16. The mechanism for transmitting torque is indicated generally as a variable drive speed mechanism 18 which is interposed between the electric motor 14 and the rotatable drum 12 and regulates the speed of the drum, as will be more fully discussed later. The clothes dryer machine 10 usually includes a control panel 20 where the user of the machine may manipulate appropriate controls to program the machine for it to proceed through the selected operational procedures. In the case of this invention there is also included in the control panel 20 a portion of a manually operated shift mechanism 22 so that the user may select the desired rotational speed of the drum 12.

Figure 2:
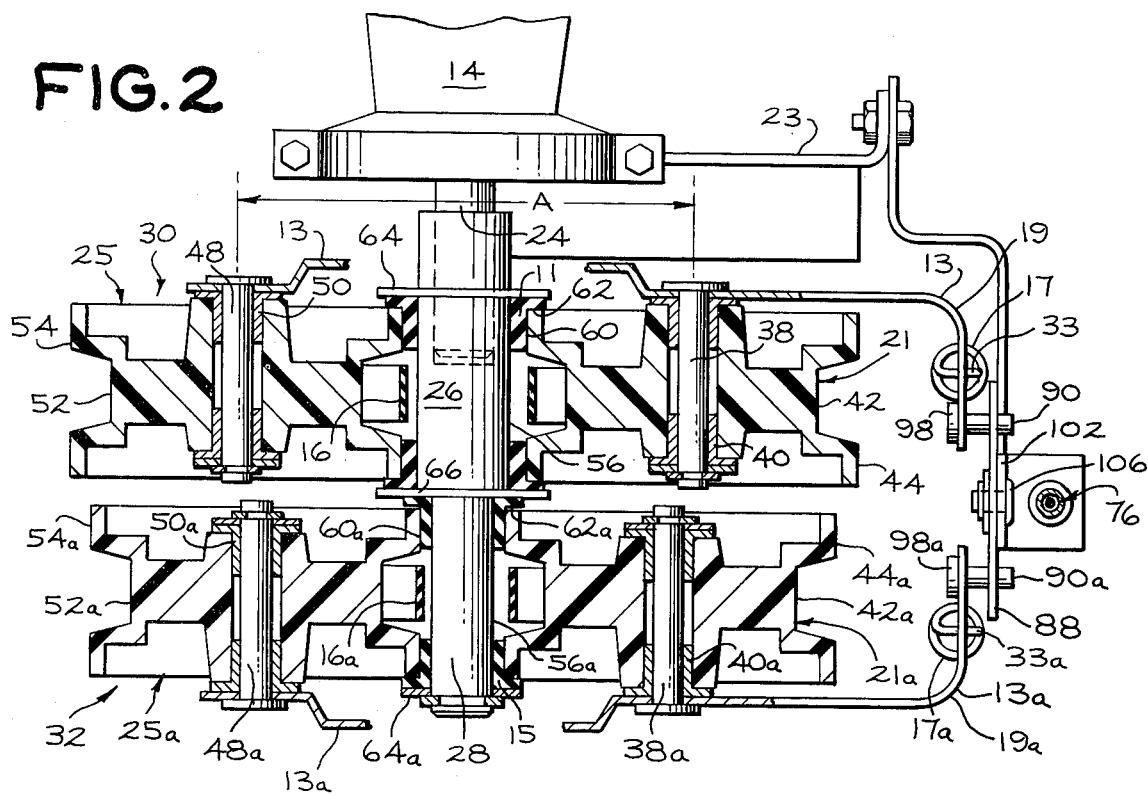
FIG. 2 is an enlarged top plan view of the present invention with portions broken away to show details of the variable speed drive mechanism.

With reference to the drawings and particularly FIGS. 1 and 2, the variable drive speed mechanism 18 will be discussed. The variable drive speed mechanism 18 includes two pulley assemblies 30 and 32 which are identical in structure arrangement and function. Therefore only one of the pulley assemblies will be discussed in detail and the corresponding elements in the other pulley assembly will be identified by the same number with an "a" suffix. The driving rotatable member for the system is, in this case motor shaft 24 driven by the electric motor 14. There is a first diameter area 26 and a second diameter area 28 connected to the driving member 24, the first diameter area 26 having a greater diameter than the second diameter area 28. Both of these diameter areas 26 and 28 have a pulley assembly 30 and 32, respectively, which are pivotable about the driving rotatable member 24. Each of the pulley assemblies will now be described with reference to the components of pulley assembly 30 and the corresponding elements in pulley assembly 32 will have an "a" suffix. Included are two rotatable pulleys, such as first pulley 21 and second pulley 25, that have their longitudinal rotational axes 38 and 48 respectively, parallel. Connecting the axes 38 and 48 of both pulleys 21 and 25 is a rigid separating or spacing member 13. As an assembly, then, pulleys 21 and 25 have their respective longitudinal axes of rotation spaced apart by a fixed distance, denoted as "A" in FIG. 2.

Driving member 24 is rotatable but in a stationary position as the motor 14 is secured in place by a mounting bracket 23 attached to the base 36 of the clothes dryer machine 10. Driving member 24 has connected to it for rotation therewith two pulleys 11 and 15. Pulley 15 has a smaller diameter than pulley 11. The pulleys 11 and 15 are referred to herein as a first diameter area and a second diameter area, respectively. At one end 19 of the rigid spacing member 13, remote from the axes 38 and 48 of the pulleys 21 and 25, there is a spring 17 secured to end 19 by a hook portion 33. The opposite end 27 of the spring 17 has a hook portion 29 which is secured to a stationary member 31 that is in turn secured to the base 36 of clothes dryer machine 10. The pulley drive mechanism assembly 30 is arranged in a wedge-like relationship to the driving member 24 and attached pulley 11, such that the longitudinal axis of rotation of the driving member 24 is parallel with the longitudinal axis of rotation of the pulleys 21 and 25.

Figure 3:
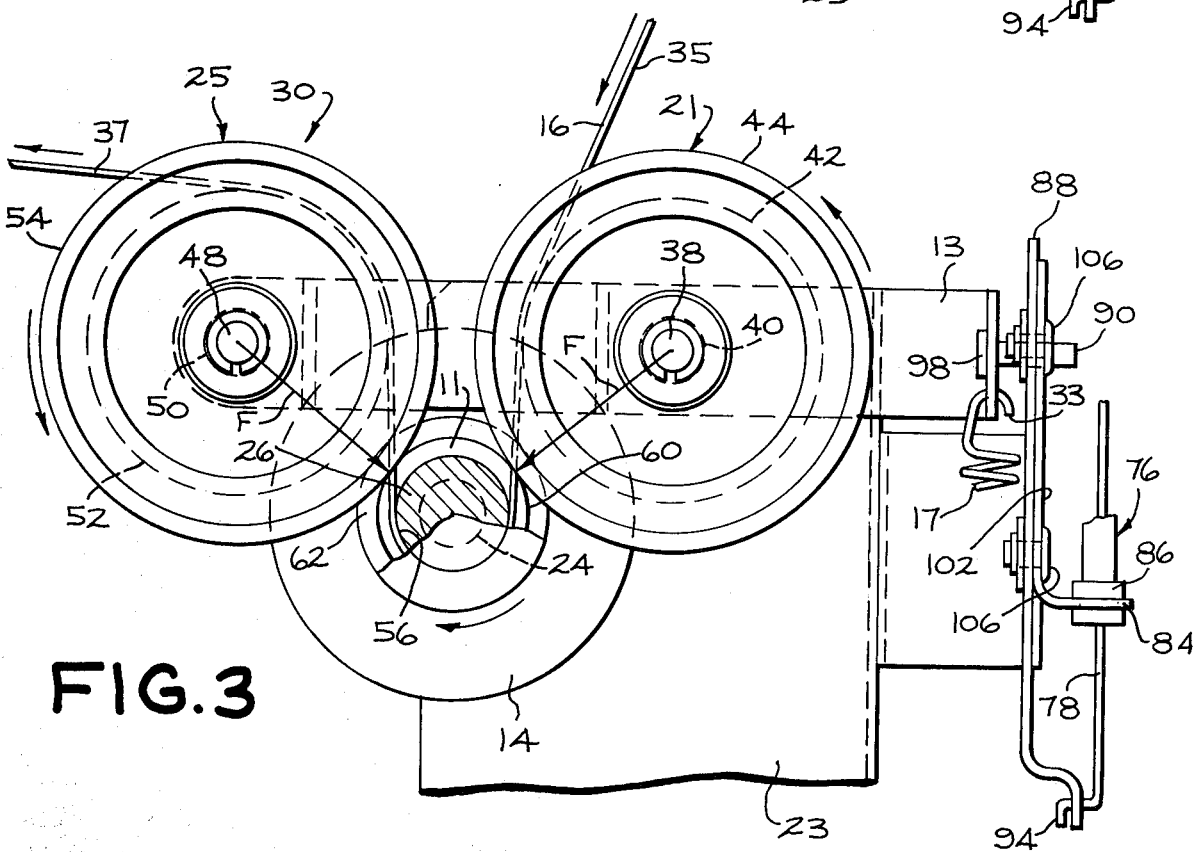
FIG. 3 is a side elevational view showing the variable speed drive mechanism of the present invention in the fast speed driving position.

With particular reference to FIGS. 1, 2 and 3, there will be described the more detailed structure arrangement of the variable drive speed mechanism, showing the cooperative relationship between the components thereof, to accomplish the desired function of the mechanism. FIG. 3 is a view of pulley assembly 30 which is arranged to pivot about the larger first diameter area 26 connected to the driving member 24. Pulley 21 rotates about its axle 38 which has a bearing 40 secured to the rigid separating member 13. Pulley 21 has a reduced interior diameter that is a flat or smooth surface 42 which is located within the flanged periphery 44 and it is spaced radially outwardly of the axle 38. Pulley 25 is structurally arranged in the same manner as pulley 21 and the elements thereof consist of an axle 48, a bearing 50, a smooth reduced interior diameter surface 52, flanged periphery 54, and the smooth interior surface 52 is separated or spaced from the axle 48.

Driving member 24 has secured to it for rotation therewith a first diameter area in the form of a pulley 11 comprising a smooth interior surface 56 and radially outward thereof is a driving surface 60 bounded laterally by perpendicular guide walls 62 which are held in their respective positions, relative to the center of the pulley 11, by retaining members 64 and 66. Retainer member 66 is a common retainer between pulleys 11 and 15.

A belt, such as endless, flat drive belt 16, serves to transmit torque between driving member 24 and a driven rotatable member, such as a clothes retaining drum 12 of a domestic clothes dryer. FIG. 3 shows the path of travel of drive belt 16. The direction of travel of drive belt 16 has been denoted in FIG. 3 by arrows, with section 35 being under greater tension than section 37 when driving member 24 rotates in a clockwise direction, as indicated by an arrow in FIG. 3. Tracing the path, then, of drive belt 16, it proceeds around first pulley 21 and is in contact with smooth reduced interior diameter surface 42, between the first pulley 21 and driving pulley 11, passing around the pulley 11 and in contact with the smooth reduced interior diameter pulley surface 56 thereof, exiting between pulley 11 and the second pulley 25, passing partially therearound, and in contact with the reduced interior diameter surface 52 thereof, to proceed to the driven rotatable drum 12. It will be noted that the flanged periphery 44 of pulley 21 rides on driving surface 60 of pulley 11 and the flanged periphery 54 of pulley 25 also rides on driving surface 60 of pulley 11.

As torque is applied to driving member 24 by the motor 14 causing the driving member 24 and therefore pulley 11 to rotate in a clockwise direction as shown by the arrow in FIG. 3, the tightening within the system will cause pulleys 21 and 25, respectively, to exert radial forces "F" against belt 16 normal to driving member 24, so as to achieve non-slipping, rolling engagement between driving surface 60 and flanged peripheries 54 and 44 of pulleys 25 and 21, respectively, to effect driving force to the belt 16 riding on surfaces 52, 56 and 42. Also, the rotation of pulley 11 causes driving rotation of both pulleys 21 and 25 which, in addition to pulley 11, exert driving force upon the belt 16. This is particularly advantageous since a large surface area contact between belt 16 and the reduced interior diameter surfaces 42 and 52, respectively, of pulleys 21 and 25, is achieved thus reducing slippage of the belt and increasing traction. Furthermore, by this arrangement, automatic belt tensioning is accomplished because belt 16 tightens and, as greater torque is transmitted by driving member 24, the driving pulley assembly 30 may pivot with respect to the longitudinal rotational axis of the driving member 24 in a direction corresponding to the direction of rotation of the driving member 24 automatically taking up any slack in the belt 16 by the passing of the belt 16 further around the downstream pulley 25. In so doing the force of the belt against the pulley 11 will become even greater, thereby effecting even greater driving engagement therebetween. In other words, the greater the torque transmitted, the greater the ability to transmit torque. It should be noted that by this arrangement the belt 16 is only driven and does not function as a guide for aligning the pulleys 21 and 25 thus affording longer belt life due to reduced stress as compared to other pulley arrangements that use the belt as a guide. It will be understood that to prevent belt slippage during driving the ratio between the diameter of flanged periphery 54 of pulley 25 to the diameter of driving surface 60 should be the same as the diameter of smooth interior diameter surface 52 is to surface 56. Also the ratio between the diameter of flanged periphery 44 of pulley 21 to the diameter of driving surface 60 should be the same as the diameter of smooth interior diameter surface 42 is to surface 56. For a particular system in which the belt drive mechanism is used, the relative diameters of pulleys 21 and 25 will determine the tension applied to the belt. The diameters of the pulleys may be varied to accommodate a particular belt and the diameters of the pulleys relative to each other may be different and varied. Such a torque transmitting pulley assembly arrangement is shown and claimed in copending U.S. patent application Ser. No. 619,692 filed Oct. 6, 1975 in the name of the present inventor and assigned to the same assignee as this invention.

In a condition when belt 16 has excess length, as motor torque is applied to the driving member 24, portion 35 of the belt becomes taut and portion 37 becomes slack. This unbalance of forces causes the whole variable drive speed mechanism to pivot clockwise about driving member 24, because belt portion 35 tries to approach a straight line as a limit. The geometry of the system is such that, as the pulley assembly 30 pivots, then belt slack in belt portion 37 will be taken up by further wrapping of the belt around pulley 25. While a flat belt 16 is shown and described herein, this belt drive mechanism may also utilize a V-belt or multiple or poly V-belt wherein the traction face has ribs and grooves that are received in complementary ribs and grooves in the reduced diameter surfaces of the pulleys.

Spring biasing force, as afforded by spring 17, is arranged to afford a slight biasing force to take up and compensate for any possible manufacturing tolerance variations in the assembly to prevent any possible bouncing effect during startup and to return the pulley assembly 30 a first position of the shift mechanism 22.

Figures 7, 8:
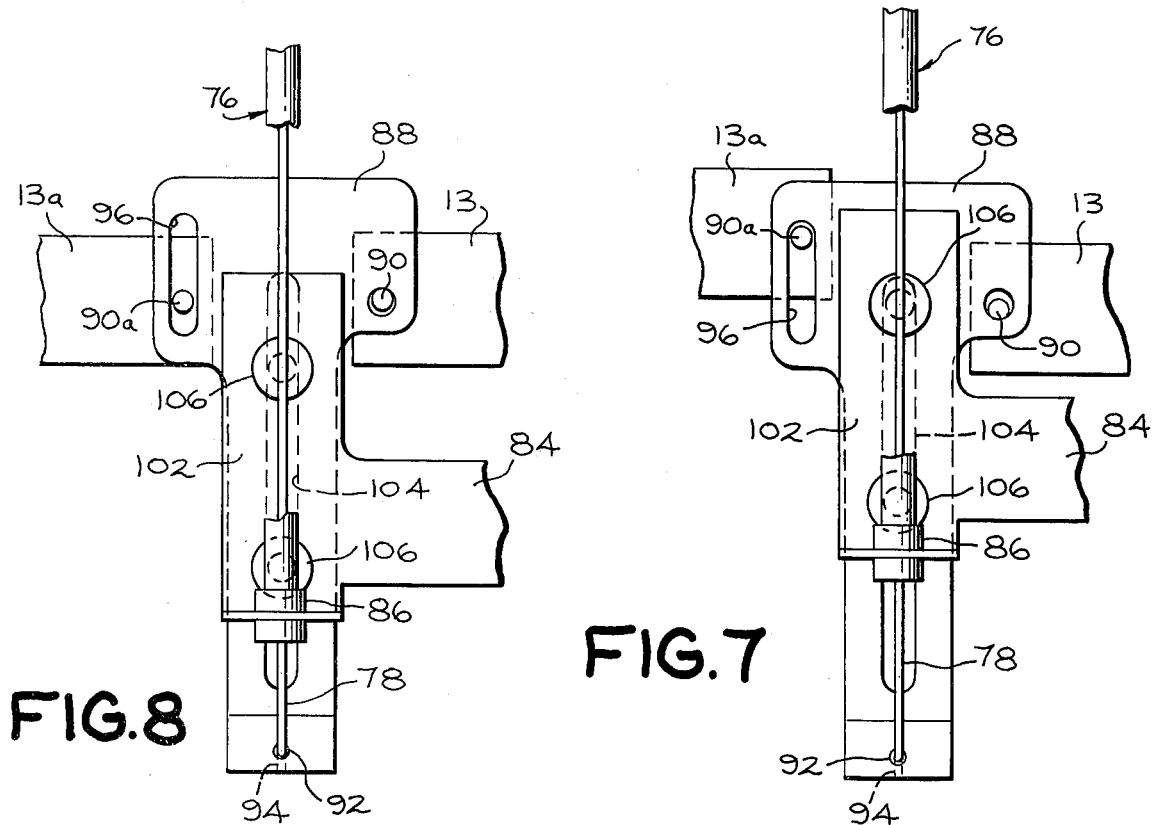
FIG. 7 is a side elevational view of a portion of the shift mechanism of the present invention showing the fast speed condition.
FIG. 8 is the same as FIG. 7 showing the slow speed condition.

To control the variable drive speed mechanism 18 responsive to selection by the user of the clothes dryer machine 10, for either high speed rotation of the drum 12, low speed, or no speed at all during operation of the machine there is a shift mechanism 22 for manual manipulation by the user of the machine. Located on the control panel 20 there is an actuating arm 68 which is pivotable about a pin 70 secured to a support bracket 72 which in turn is secured to the clothes dryer machine 10. A portion 74 of the actuating arm 68 extends through the front of the control panel 20 for access to the user. Between the portion 74 and the pin 70 a choke cable 76 is attached. The choke cable 76 is of the usual construction wherein an internal wire 78 is movable relative to an outer sheath 80. The sheath 80 is secured to the clothes dryer machine 10 by appropriate fastening means 82 at one end thereof and at the opposite end the sheath 80 is secured to a rigid stationary member 84 (FIGS. 3–6) by fastening means 86. In this manner then the sheath 80 is maintained in a fixed position while internal wire 78 is movable relative to the sheath 80 by moving or shifting the actuating arm 68. The spacing members 13 and 13a of the pulley assemblies 30 and 32, respectively, are joined by a lost motion member 88 as by suitable fastening means such as studs 90. The lost motion member 88 as best shown in FIGS. 7 and 8 has a means such as a hole 92 for receiving the internal wire 78 of the choke cable 76 and may be connected to the lost motion member 88 by any suitable means such as a hook-shaped portion 94 at the end of the internal wire 78. The stationary member 84 holds the lost motion member 88 and the latter is movable relative to the stationary member 84 by rivets 106 passing through an elongated slot 104 in the lost motion member 88 and movable within the slot 104. The lost motion member 88 has a slot opening 96 to receive stud 90a which has a head 98a fastened securely to spacing member 13a as by soldering. Stud 90a through the slot 96 is movable within the slot. By this arrangement then when the actuating arm 68 is in its lowermost position as shown in FIG. 1, the internal wire 78 and lost motion member 88 are in the position shown in FIG. 7.

Figure 6:
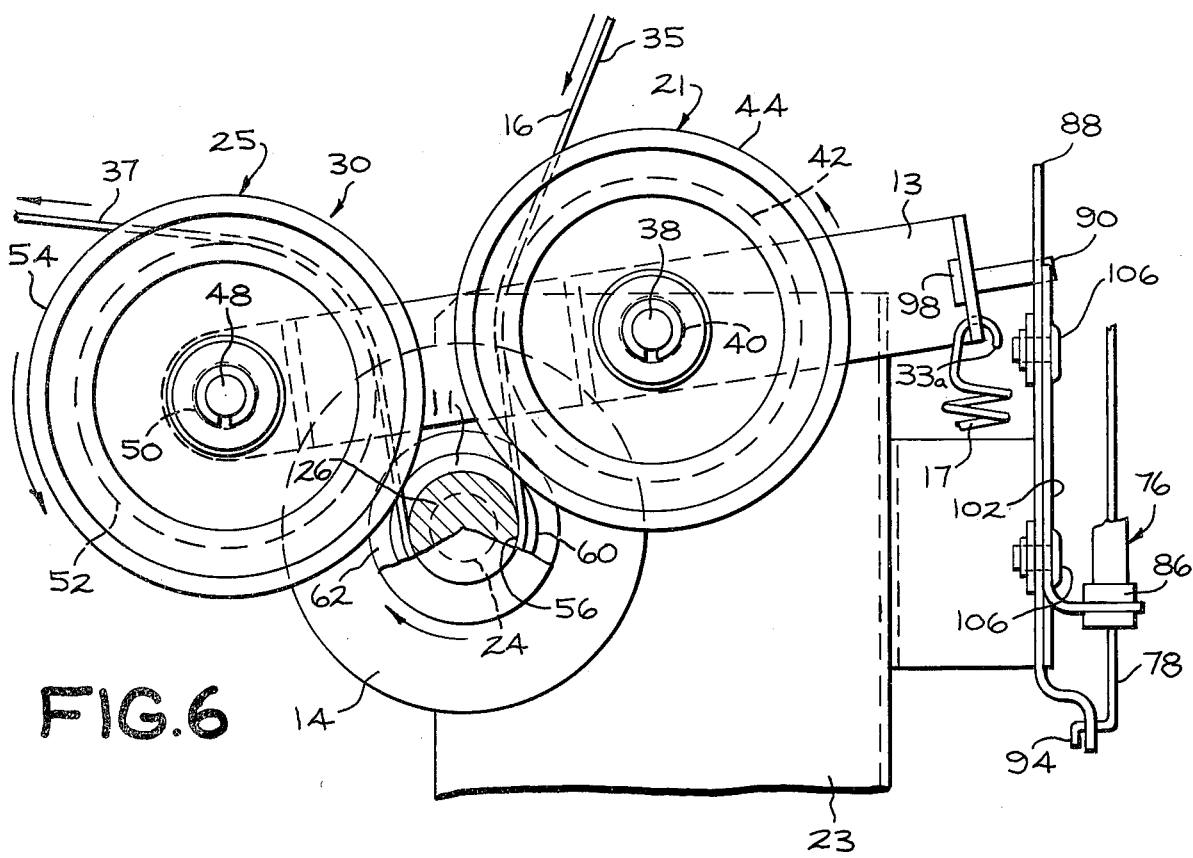
FIG. 6 is a side elevational view of the variable speed drive mechanism in slow driving speed showing part of the mechanism in its idling condition.

This is the position in which the drum 12 will be rotated at high speed and it will be noted that the internal wire 78 will not act to change the position of the lost motion member 88 and neither will the spacing members 13 and 13a for pulley assemblies 30 and 32, respectively, be moved at the time of manually shifting the mechanism 22. If the user desires the low speed setting the actuator arm 68 on the control panel 20 is moved up to the position as indicated in FIG. 1 causing the internal wire 78 to be moved vertically resulting in the spacer member 13 of pulley assembly 30 to also be moved vertically while the stud 90a merely moves within slot 96 without a corresponding movement of spacer member 13a for pulley assembly 32. This pulley assembly 30 position is shown in FIG. 6. Should the user desire to operate the machine without rotation of the drum 12, then the actuator arm 68 on the control panel 20 is moved to the uppermost position shown in FIG. 1 thus further raising the internal wire 78 vertically and that movement in turn causes the lost motion member 88 and the spacer members 13 and 13a for both pulley assemblies 30 and 32 to be moved upwardly. Having thus discussed the shift mechanism and how the respective pulley assemblies may be rotated about the driving member 24, we will now discuss how the mechanism affects the operation of the clothes dryer drum.

Figure 4:
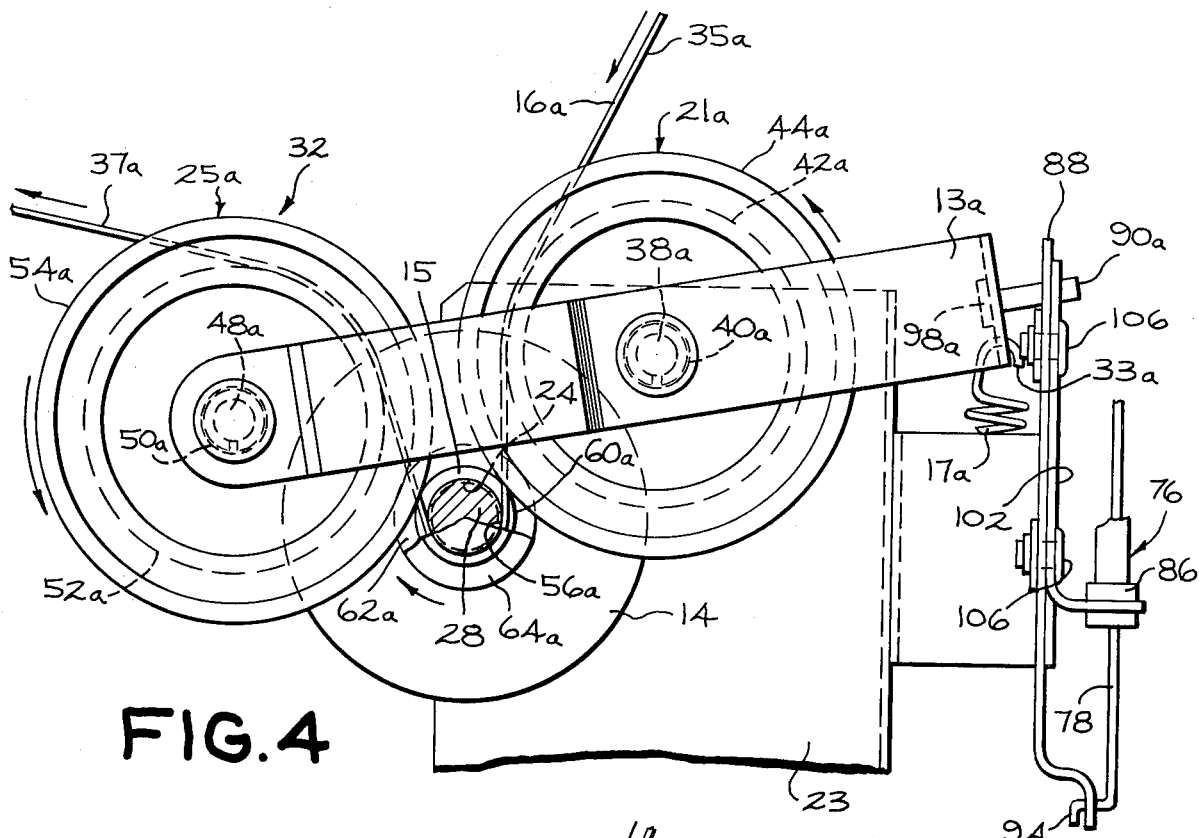
FIG. 4 is a side elevational view of the variable speed drive mechanism in the fast driving speed showing part of the mechanism in its idling condition.

With reference to FIGS. 3 and 4, there is shown the respective pulley assemblies 30 and 32 in their relative positions during the high speed rotation of the clothes dryer drum 12. In this condition the clothes dryer machine user has set the actuating arm 68 on the control panel 20 as indicated in FIG. 1 in the lowermost position. The lost motion member 88 is in the position shown in FIG. 7 wherein the internal wire 78 has not moved the lost motion member 88 and therefore neither of the spacing members 13 and 13a have been moved. As shown and described previously in connection with FIG. 3, torque is transmitted from the pulley 11 to the drum by the endless belt 16. The drum 12 in turn drives the belt 16a through the pulley assembly 32. Belt 16a tries to drive the smaller second diameter area 28, however, its circumferential velocity is less than the velocity of the belt 16a. This makes the normally slack side of the belt the tight side. In turn this loosens the belt 16a associated with the pulley assembly 32 because of the resultant rotation of the low speed pulley assembly 32 relative to the driving member 24 and the belt 16a will slip. The result is that the drum 12 is driven at high speed.

Figure 5:
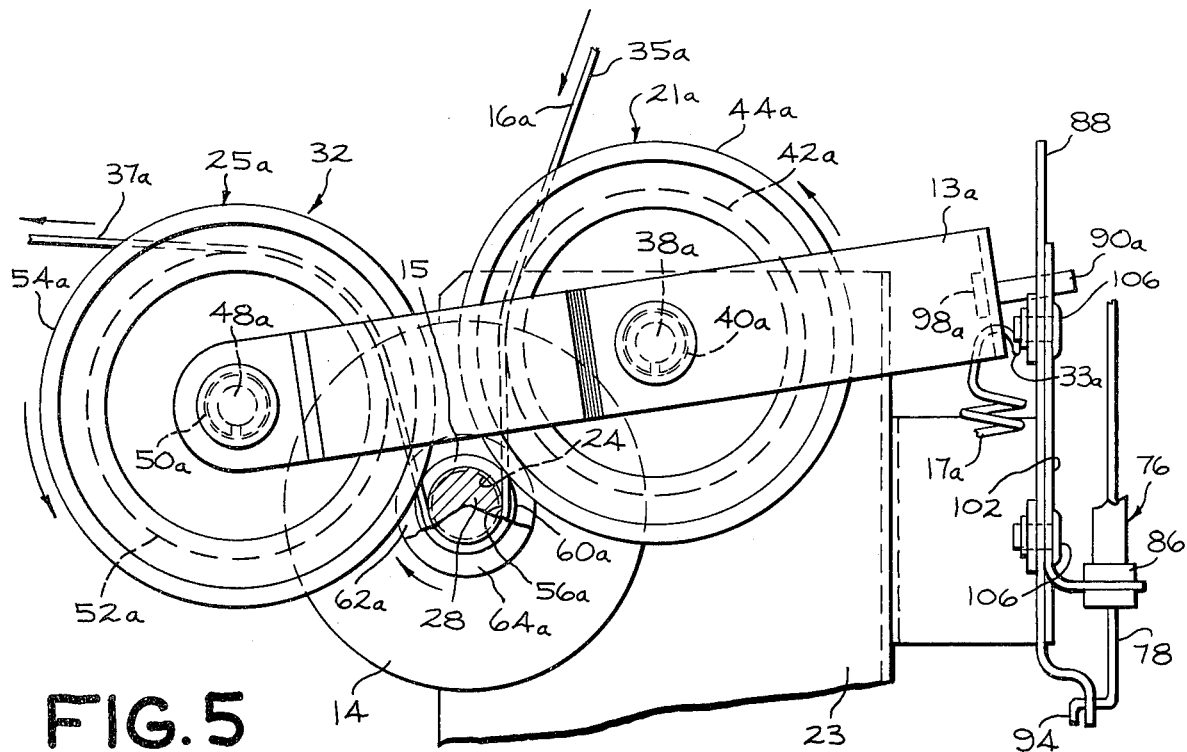
FIG. 5 is a side elevational view of the variable speed drive mechanism showing the slow driving speed condition of the present invention.

With reference now to FIGS. 5 and 6, if the clothes dryer machine user sets the actuating member 68 on the low speed setting by thus raising the actuator arm and correspondingly raising the internal wire 78 of the choke cable 76, the lost motion member 88 is also raised. Accordingly, the spacer member 13 of the pulley assembly 30 is raised. The result is that pulley assembly 30 is caused to rotate about the driving member 24 in a direction opposite the direction of rotation of driving member 24 and thus loosen the belt 16 into a slipping condition. Due to the lost motion arrangement the driving effect of pulley assembly 32 in the low speed setting is not affected.

Should the user desire not to have the drum 12 rotating while the machine is operating, then the actuating arm 68 is raised to its uppermost position causing internal wire 78 of choke cable 76 to also be raised and since the lost motion aspect has been taken up as shown in FIG. 8 the lost motion member 88 raises both spacing members 13 and 13a of pulley assemblies 30 and 32, respectively. In this condition then both belts 13 and 13a will slip and no torque will be transmitted to the drum.

It should be apparent to those skilled in the art that the embodiments described heretofore are considered to be the presently preferred forms of the invention. In accordance with the patent statutes, changes may be made in the disclosed mechanism in the manner in which it is used without actually departing from the true spirit and scope of this invention.

What is claimed is:

1. In a clothes dryer having a driven rotatable drum and a mechanism for transmitting torque between a driving rotatable member and the driven rotatable drum through an endless drive belt, the improvement comprising:

(a) the driving rotatable member having a first diameter area and a second diameter area, the first area having a greater diameter than the second area, (b) two pulley assemblies, one being pivotable about the first diameter area and one pivotable about the second diameter area and each assembly including two pulleys with outside diameter flanges, reduced interior diameters, and having their longitudinal axes of rotation parallel and spaced a fixed distance apart by a spacing member secured to each pulley at their respective axes of rotation; the driving member having its longitudinal axis of rotation parallel to the rotational axes of the pulleys and arranged in a wedge-like relationship therebetween, the flanges of each pulley being in contact with the driving member;

(c) a drive belt for each pulley assembly passing over the respective first and second areas of the driving member and then over the reduced interior diameters of both of the flanged pulleys of the respective assemblies; and (d) a shift mechanism to provide three modes of drum operation including;

(i) means to transmit torque from the first driving member area through its pulley assembly and belt to the drum causing the belt around the second driving member area to slip, (ii) means to rotate the pulley assembly about the first driving member area opposite the direction of rotation of the driving member thereby causing the belt to slip while torque is transmitted to the drum from the second driving member through its pulley assembly and belt, and (iii) means to rotate both pulley assemblies simultaneously about the driving member opposite the direction of rotation of the driving member to cause both belts to slip whereby no torque is transmitted to the drum.

2. In the clothes dryer of claim 1 wherein the driving member has a reduced interior diameter.

3. In the clothes dryer of claim 1 wherein each belt is supported and driven by the reduced interior diameter of both pulleys and the driving member.

4. In the clothes dryer of claim 1 wherein the spacing member is biased toward the driving member.

5. In the clothes dryer of claim 1 wherein the means to rotate the pulley assemblies about the driving member is an actuating cable assembly connected to both of the spacing members wherein actuation to one position rotates only the assembly about the second diameter and actuation to another position rotates both assemblies about the driving member.

6. In the clothes dryer of claim 1 wherein as torque is applied to the driving member, the driving pulley assembly may pivot with respect to the longitudinal rotational axis of the driving member in a direction corresponding to the direction of rotation of the driving member for taking up, automatically any slack by the passing of the belt further around the down stream pulley to effect proper belt tensioning.

* * * * *